US010391738B2

(12) United States Patent
Liu et al.

(10) Patent No.: US 10,391,738 B2
(45) Date of Patent: Aug. 27, 2019

(54) VACUUM HEAT-INSULATION MATERIAL

(71) Applicant: Panasonic Corporation, Osaka (JP)

(72) Inventors: Baiyu Liu, Osaka (JP); Toru Okazaki, Osaka (JP); Terutsugu Segawa, Osaka (JP); Yasuhiro Asaida, Kyoto (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 15/684,713

(22) Filed: Aug. 23, 2017

(65) Prior Publication Data

US 2018/0072018 A1    Mar. 15, 2018

(30) Foreign Application Priority Data

Sep. 12, 2016 (JP) ................................ 2016-177395
May 29, 2017 (JP) ................................ 2017-105297

(51) Int. Cl.

| | |
|---|---|
| ***B32B 5/12*** | (2006.01) |
| ***B32B 5/18*** | (2006.01) |
| ***B32B 15/09*** | (2006.01) |
| ***B32B 15/20*** | (2006.01) |
| *E04B 1/80* | (2006.01) |
| *F16L 59/065* | (2006.01) |
| *F25D 23/06* | (2006.01) |

(52) U.S. Cl.

CPC .................. *B32B 5/12* (2013.01); *B32B 5/18* (2013.01); *B32B 15/09* (2013.01); *B32B 15/20* (2013.01); *B32B 2262/101* (2013.01); *B32B 2266/0228* (2013.01); *B32B 2266/0278* (2013.01); *B32B 2307/304* (2013.01); *B32B 2307/7246* (2013.01); *B32B 2307/7265* (2013.01); *B32B 2509/10* (2013.01); *E04B 1/803* (2013.01); *F16L 59/065* (2013.01); *F25D 23/06* (2013.01); *F25D 23/065* (2013.01); *F25D 2201/124* (2013.01); *F25D 2201/14* (2013.01); *Y10T 428/231* (2015.01)

(58) Field of Classification Search

CPC .... Y10T 428/231; F16L 59/065; E04B 1/803; Y02B 80/12; F25D 2201/14

See application file for complete search history.

(56) References Cited

U.S. PATENT DOCUMENTS 7,846,371 B2 * 12/2010 Murakami .............. F16L 59/04 264/322
7,993,723 B2 * 8/2011 Jung .................... F16L 59/065 312/406

FOREIGN PATENT DOCUMENTS

CN 103511796 A * 1/2014
JP 4649969 B 3/2011

* cited by examiner

*Primary Examiner* — Alexander S Thomas
(74) *Attorney, Agent, or Firm* — McDermott Will & Emery LLP

(57) ABSTRACT

A vacuum heat-insulation material includes: at least one first fiber member; at least one second member that is placed around an outer peripheral part of the at least one first fiber member and that is thinner than an inner part; and at least one shell material that surrounds the at least one first fiber member and the at least one second fiber member.

12 Claims, 6 Drawing Sheets

VACUUM HEAT-INSULATION MATERIAL

TECHNICAL FIELD

The technical field relates to a vacuum heat-insulation material, and apparatuses in which the vacuum heat-insulation material is employed.

BACKGROUND

In order to maintain heat-insulation performance of vacuum heat-insulation materials for a long period of time, it is required that films having excellent gas-barrier properties are used in shell materials so as to prevent penetration of outside gases into the vacuum heat-insulation materials, thereby maintaining vacuum states inside the vacuum heat-insulation materials.

For the above purpose, films including metal foils such as aluminum foils have been employed for shell materials in conventional arts. However, when such films including metal foils are used for vacuum heat-insulation materials, penetration of heat through metal foils (so-called "heat bridge") is caused, and thus, there is a problem in which expected heat-insulation performance is not obtained.

To solve such phenomena of heat bridge, methods in which stainless-steel-foil layers, ceramic-vapor-deposited-film layers, aluminum-vapor-deposited-film layers, or the like that have comparatively small heat conductivity are used as barrier layers, instead of using aluminum-foil layers, have been known.

Furthermore, as disclosed in the publication of Japanese Patent No. 4,649,969, there is also a method in which, in consideration of realization of sufficient gas-barrier properties and prevention of heat bridge phenomena, a laminate film that includes an aluminum-foil layer as a component layer and that serves as a gas-barrier layer is used for at at least one of the shell materials present at the front and the back of the vacuum heat-insulation material. As another example, there is a method in which a laminate film that includes, as component layers, at least two barrier-film layers including multiple inorganic-oxide-vapor-deposited layers serving as gas-barrier layers is employed as a shell material can be mentioned.

SUMMARY

However, although the occurrence of heat bridge is somewhat reduced according to the method disclosed in the publication of Japanese Patent No. 4,649,969, the rate of reduction is small. Thus, the occurrence of the heat bridge has not yet sufficiently been improved. Furthermore, the smaller sizes of vacuum heat-insulation materials are, the more significant influences of heat bridge will be. Therefore, in such cases, it is required that the occurrence of heat bridge is further reduced.

The disclosure solves the above-mentioned problem in conventional arts. An object of the disclosure is to further reduce the occurrence/influences of heat bridge phenomena through shell materials in vacuum heat-insulation materials.

In order to solve the above object, according to an aspect of the disclosure, provided is a vacuum heat-insulation material, including: at least one first fiber member; at least one second fiber member that is placed around an outer peripheral part of the at least one first fiber member and that is thinner than an inner part; and at least one shell material that surrounds the at least one first fiber member and the at least one second fiber member.

In some embodiments, the at least one second fiber member may be a member that is formed separately from the at least one first fiber member.

In some embodiments, the at least one second fiber member and the at least one first fiber member may be formed into a single body.

The disclosure makes if possible to reduce occurrence/influences of heat bridge phenomena in vacuum heat-insulation materials, thereby improving heat-insulation performance of vacuum heat-insulation materials. As a result, the disclosure makes it possible for heat-retention/cold-storage apparatuses, office machines, and the like to deliver excellent energy-saving performance when they are equipped with the vacuum heat-insulation material according to the disclosure.

DESCRIPTION OF EMBODIMENTS

Hereinafter, embodiments will be described with reference to the drawings.

First Embodiment

Figure 1:
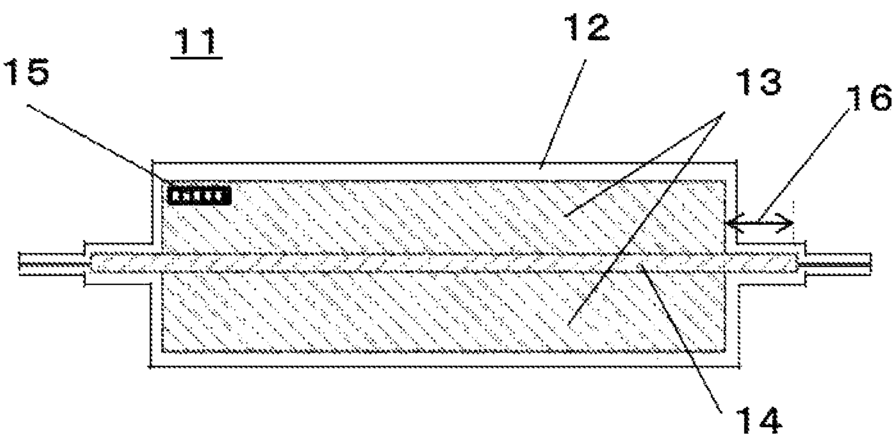
FIG. 1 is a cross-sectional view of a vacuum heat-insulation material according to a first embodiment.
Figure 2:
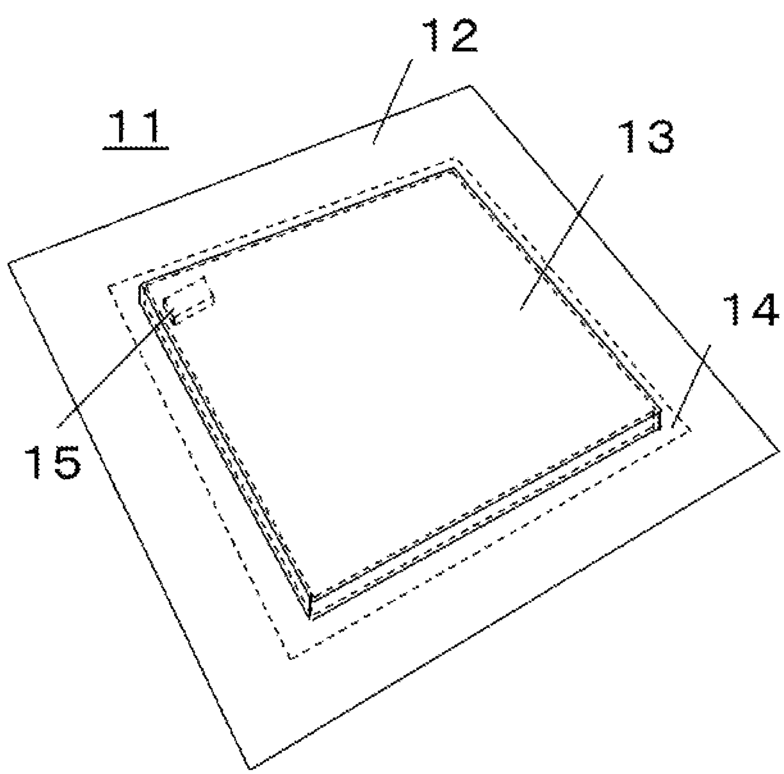
FIG. 2 is a perspective view of the vacuum heat-insulation material according to the first embodiment.

FIG. 1 is a cross-sectional view of the vacuum heat-insulation material according to the first embodiment, and FIG. 2 is a perspective view of the vacuum heat-insulation material according to the first embodiment.

<Structure>

In FIG. 1, the vacuum heat-insulation material 11 includes shell materials 12, first fiber members 13, a second fiber member 14, and an absorbent 15. A size 16 refers to a length of a protruding part of the second fiber member 14.

The shell materials 12 maintain the vacuum state of the vacuum heat-insulation material 11. The shell materials 12 each have the following configuration. That is, an innermost layer that is formed of a film for the purpose of heat-sealing (described below); a barrier layer that has a double structure configured by at least two gas-barrier films (described below) and that supresses penetration of gas and water; and an outermost protective layer that is formed of a surface-protective film (described below) are provided therein.

For the above-mentioned film for the purpose of heat-sealing, which forms the innermost layer, for example, thermoplastic resin films (e.g., low-density polyethylene films, linear low-density polyethylene films, high-density polyethylene films, polypropylene films, and polyacrylonitrile films), or mixtures of these materials can be employed.

For the above-mentioned gas-barrier films, which configure the barrier layer that has a double structure, for example, metal foils such as aluminum foils and copper foils; and films obtained by vapor-deposition of metals (e.g., aluminum and copper) or metal oxides (e.g., alumina, silica) onto substrates such as polyethylene-terephthalate films, and ethylene-vinyl alcohol copolymer films can be used.

For the above-mentioned surface-protective film, which forms the outermost protective layer, for example, any known materials such as nylon films, polyethylene terephthalate films, and polypropylene films can be used. The thickness thereof may be about 0.1 mm.

With regard to the first fiber members 13 and the second fiber member 14, the second fiber member 14 that is formed in one rectangular parallelepiped shape is placed between two first fiber members 13 that are each formed in rectangular parallelepiped shapes. The second fiber member 14 is larger than the first fiber members 13 in planar view. That is, the second fiber member 14 protrudes outward beyond peripheries of the first fiber members 13.

The first fiber members 13 and the second fiber member 14 both support the shell materials 12, and may foe formed of compacts including glass fibers. In addition, as materials for the first fiber members 13 and the second fiber member 14, materials having low conductivity are used, and forms of foams, powder/granular materials, and fibers thereof can foe employed. As examples of the foams, interconnected-cell urethane foams, styrene foams, and phenol foams can be mentioned. The powder/granular materials include inorganic and organic materials, and include, for example, those obtained by crushing various types of foam materials, and silica, alumina, and pearlite. The fibers include inorganic and organic materials, and, for example, include glass fibers, glass wool, rock wool, and cellulose fibers.

Moreover, for materials used for the first fiber members 13 and the second fiber member 14, comparatively-low-heat-capacity foams such as urethane foams, or powder/granular materials of such foams may also be employed. In addition, mixtures of the above-mentioned various types of foams, powder/granular materials, and fibers may be employed therefor.

Furthermore, materials of the first fiber members 13 and the second fiber member 14 may be different from each other.

In addition, although, in the first embodiment, the first fiber members 13 and the second fiber member 14 are configured as different members, by removing the second fiber member 14 from the first fiber members 13, these members may be formed in a single body to have the same shape.

The absorbent 15 suppresses increases in amounts of gaseous heat-conductive substances such penetrating gases and moisture, and may be formed of zeolites, calcium oxide, etc. The absorbent 15 is placed around a corner of one of the first fiber members 13, and is vacuum-sealed, together with the first fiber member 13. Although the absorbent 15 is not an indispensable component, it is preferably employed.

Advantages

In the process of production of the vacuum heat-insulation material 11, at first, three sides of overlapped materials for the shell materials 12 are heat-sealed to produce a bag-shaped shell material 12. Therefore, surpluses are provided in sizes of overlapped parts of the materials, such that the first fiber members 13 can foe inserted into the bag-shaped shell material 12 afterward. By utilizing the surplus parts, the second fiber member 14 is placed in the center area, and thus, a heat-transmission path in shell materials 12 is-configured to be longer. Accordingly, it becomes possible to reduce the occurrence/influences of heat bridge in the shell materials 12.

The thicker the second fiber member 14 is, or the longer the protrusion size 16 is, the more remarkable heat-bridge-reducing effects the shell materials 12 will have. Meanwhile, in consideration of practical use, the protrusion size 16 of the second fiber member 14 is preferably from about 5 mm to about 10 mm in this embodiment. In addition, since a fin part (the part shown by the size 16) of the shell materials 12 is folded for use, the thickness of the fin part is preferably about 2 mm so that the second fiber member 14 can be folded.

<Production Method>

A method for producing the vacuum heat-insulation material 11 will be described below.

Figure 3:
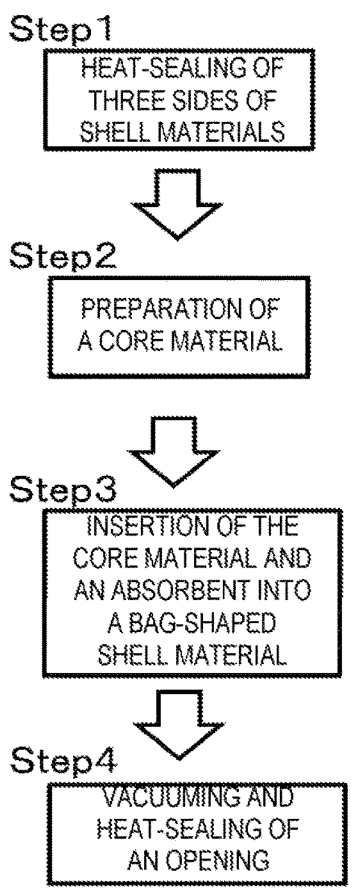
FIG. 3 is a diagram that shows a flowchart of production of the vacuum heat-insulation material according to the first embodiment.
Figure 4:
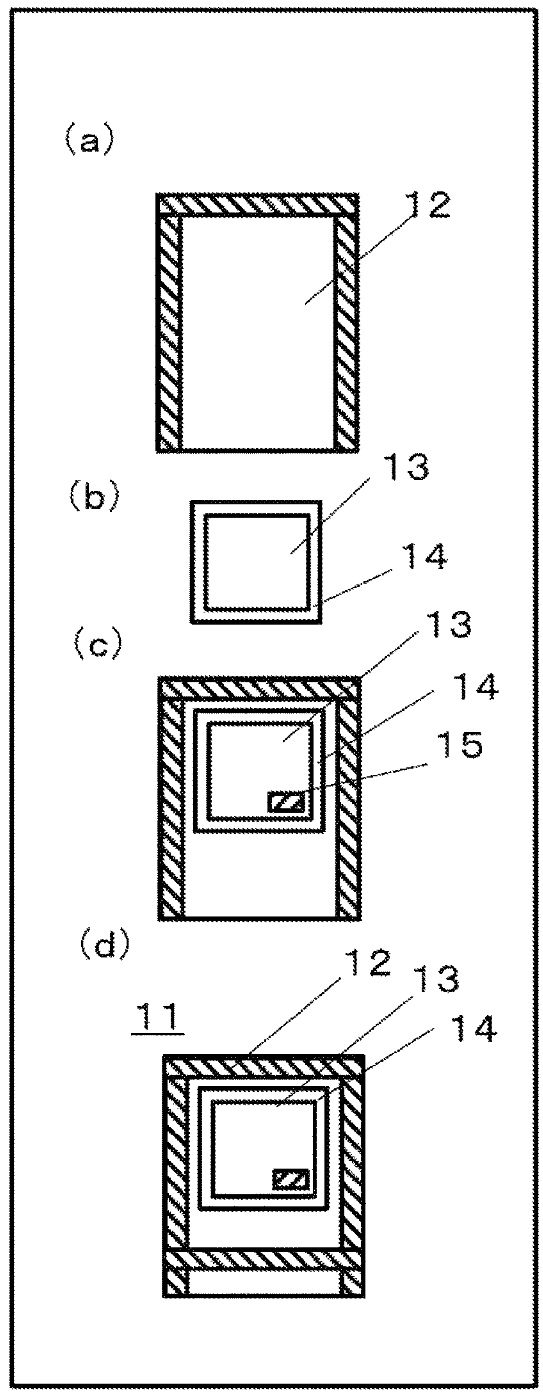
FIG. 4 shows diagrams that illustrate steps for production of the vacuum heat-insulation material according to the first embodiment.

FIG. 3 is a product ion-flowchart diagram. FIG. 4 shows plan views that illustrate production steps corresponding to the production flowchart in FIG. 3.

In Step (i) and (a) of FIG. 4, three sides of materials for the shell materials 12 are heat-sealed. In this case, the shell materials 12 are those produced by laminating the following three films: a low-density polyethylene film that is used for heat-sealing and that serves an innermost layer; a double-structure film that is formed of i) a polyacrylate-type resin film formed through aluminum vapor-deposition and ii) a PET film formed through aluminum vapor-deposition, and that serves as a barrier layer suppressing penetration of gases and water; and a nylon film that serves as an outermost protective layer.

Two rectangular laminate films are overlapped in such a manner that pairs of sides to be heat-sealed face each other, and then, one pair of the opposing sides is heat-sealed. Then, another pair of the opposing sides is heat-sealed to produce a bag-shaped shell material 12.

In Step (ii) and (b) of FIG. 4, the first fiber members 13 and the second fiber member 14 are produced. Glass fiber sheets are formed by a heat-compress ion process, and then, the resulting sheets are cut into pieces with dimensions for actual use, thereby obtaining two pieces of materials for the first fiber members 13, and one piece of material for the second fiber member 14. Subsequently, the piece of the material for the second fiber member 14 is placed between the two pieces of materials for the first fiber members 13.

In Step (iii) and (c) of FIG. 4, the layer structure of the first fiber members 13 and the second fiber member 14 prepared in Step (ii), and the absorbent 15 are inserted into the bag-shaped shaped shell material. That is, the first fiber members 13, and the second fiber member 14 are inserted, together with the absorbent 15, into the shell material 12, in a unified manner.

In Step (iv) and (d) of FIG. 4, a vacuuming process, and heat-sealing of an opening of the bag-shaped shell material are carried out. That is, the above vacuum heat-insulation material, which has an unsealed opening, is placed inside a chamber, and then, the pressure inside the chamber is reduced to 10 Pa or less. Then, the opening is heat-sealed to produce a vacuum heat-insulation material 11.

As a result, the upper and lower shell materials 12 are layered and joined in an outermost peripheral area of the vacuum heat-insulation material 11. In an area inwardly-adjacent to the outer peripheral area, the second fiber member 14 is covered with the upper and lower shell materials 12. In an innermost area of the vacuum heat-insulation material 11, the second fiber member 14 is covered with the upper and lower first fiber members 13, and the upper and lower first fiber members 13 are further covered with the upper and the lower shell materials 12, respectively.

<Evaluations>

Advantages (effects) brought about by the first embodiment of the disclosure were confirmed based on simulations. Condition for the simulations are shown in Table 1, and results of the simulations are shown in Table 2. In addition, a difference between temperatures on the upper and lower sides of the vacuum heat-insulation material 11 was set to 20 K, boundary conditions for side surfaces were set to heat insulation, and the radiation was set to be "not considered." Additionally, for the both of the shell materials 12, films obtained based on aluminum vapor-deposition and that delivered the most excellent performance were used.

A sample referred to as "COMPARATIVE EXAMPLE" in Tables 1 and 2 corresponds to an existing vacuum heat-insulation material (conventional art). A sample referred to as EXAMPLE in Tables 1 and 2 corresponds to a vacuum heat-insulation material 11 according to the present embodiment. In the example and the comparative example, the same core material having an entire thickness of 10 mm was used. However, their internal structures were different. While one piece of a first fiber member 13 having a thickness of 10 mm was used in the comparative example, two pieces of the first fiber members 13 each having a thickness of 4 mm, and one piece of the second fiber member 14 having a thickness of 2 mm were used to produce the sample in the example.

TABLE 1

| | | COMPARATIVE EXAMPLE | EXAMPLE |
|---|---|---|---|
| First fiber member 13 | Size (mm) | 1000 × 1000 | 1000 × 1000 |
| | Thickness (mm) | 10 | 8(4 × 2 pieces) |
| | Heat conductivity (W/m · K) | 0.00177 | 0.00177 |
| Second fiber member 14 | Size (mm) | — | 1040 |
| | Thickness (mm) | — | 2 |
| | Heat conductivity (W/m · K) | — | 0.00177 |
| Shell material 12 | Size (mm) | 1080 × 1080 | 1080 × 1080 |
| | Thickness (mm) | 0.1 | 0.1 |
| | Heat conductivity (W/m · K) | In-plane direction: 0.5305 Thickness direction: 0.3135 | In-plane direction: 0.5305 Thickness direction: 0.3135 |

TABLE 2

| | COMPARATIVE EXAMPLE | EXAMPLE |
|---|---|---|
| Amounts of heat passing through shell materials in vacuum heat-insulation materials per unit area (W/m$^2$) | 0.4 | 0.2 |
| Improvement rates (%) | — | 50 |

The result obtained in the simulations were as shown in Table 2 above. In the comparative example, an amount of heat that passed through a unit area of the shell materials 12 was 0.4 W. On the other hand, in the example, an amount of heat that passed through a unit area of the shell materials 12 was 0.2 W.

In other words, the vacuum heat-insulation material 11 in the example exhibited an even 50% improvement in heat bridge in compared with the comparative example. In addition, the results were based on evaluations on cases in which sheets including films produced based from aluminum vapor-deposition as intermediate layers, which exhibit low heat conductivity in the in-plane direction, were used for the shell materials 12. In cases in which aluminum foils are used as intermediate layers of shell materials 12, further improvements will be observed.

Second Embodiment

Figure 5:
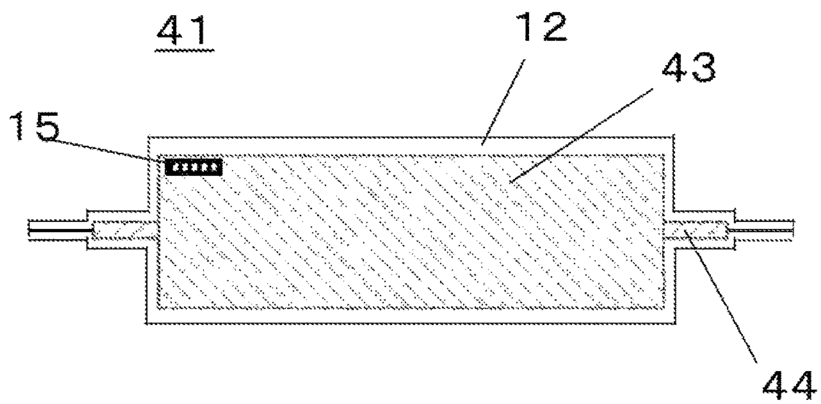
FIG. 5 is a cross-sectional view of a vacuum heat-insulation material according to a second embodiment.

FIG. 5 is a cross-sectional view of a vacuum heat-insulation material according to a second embodiment.

<Structure>

The vacuum heat-insulation material 41 according to the second embodiment differs from the vacuum heat-insulation material 11 according to the first embodiment in that the second fiber member 44 is formed in a ring shape. Matters not mentioned in this embodiment would be the same as those described for the first embodiment.

The second fiber member 44 is formed in a frame shape, and originally has an internal rectangular space. A first fiber member 43 is inserted into the internal space.

<Advantages>

Besides the advantages obtained in the first embodiment, the second embodiment brings about advantages described below.

In addition, the second fiber member 44 is embedded in a hollow in the first fiber member 43. That is, although the second fiber member 44 is embedded in the internal space of the first fiber member 43, the second fiber member 44 does not penetrate into the inside of the first fiber member 43. Accordingly, the area of the second fiber member 44 in the vacuum heat-insulation material 41 is deformable with respect to the first fiber member 43, and therefore, the vacuum heat-insulation material 41 is easy to use.

<Production Method>

A method for producing the vacuum heat-insulation material 41 will be described below.

Figure 6:
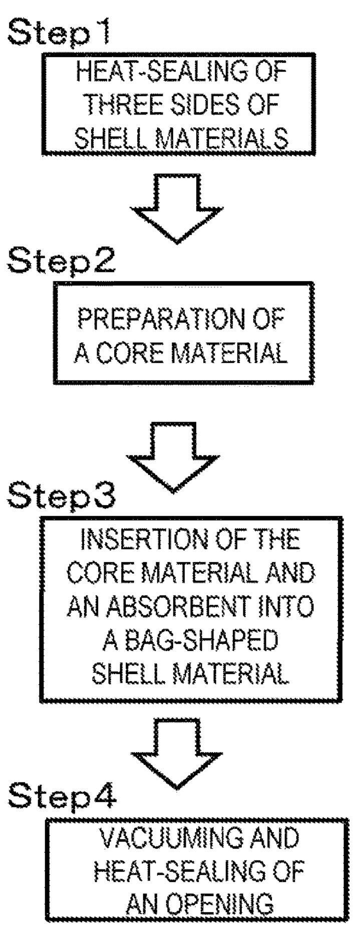
FIG. 6 is a diagram that shows a flowchart of production of the vacuum heat-insulation material according to the second embodiment.
Figure 7:
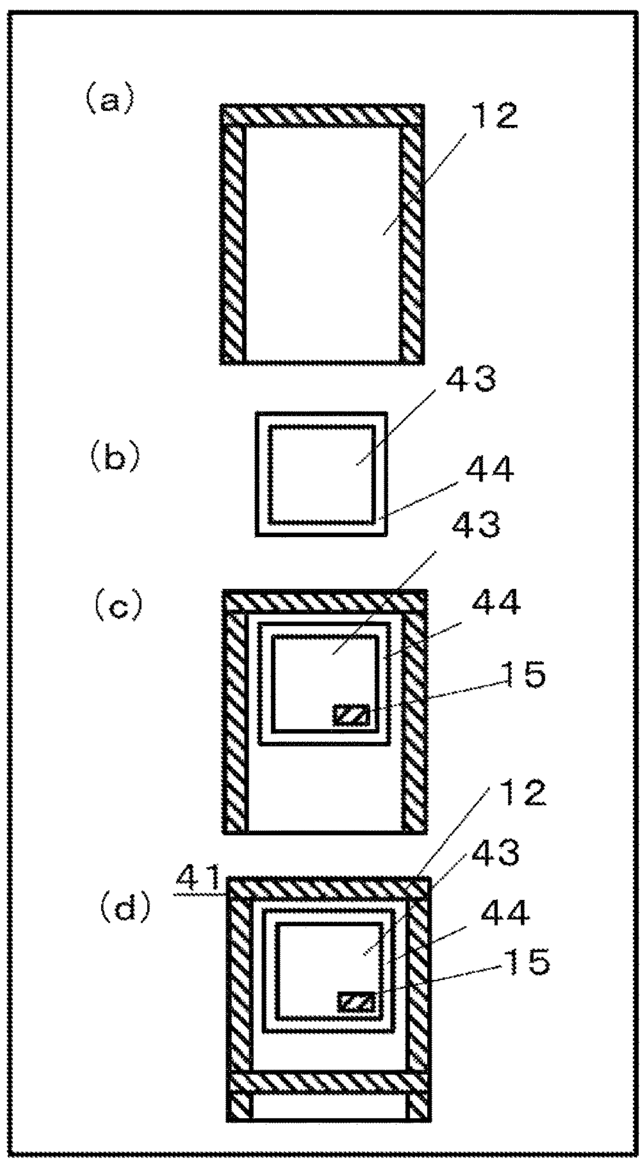
FIG. 7 shows diagrams that illustrate steps for production of the vacuum heat-insulation material according to the second embodiment.

The production flowchart is shown in FIG. 6, and the corresponding production steps are shown in FIG. 7. The production flowcharts depicted in FIGS. 3 and 6 for the first and second embodiments, respectively, are the same. The following difference is present between the first and second embodiments. That is, the production method for the second embodiment differs from the production method for the first embodiment in that, in preparation of a core material in Step (ii) and (b) of FIG. 7, the second fiber member 44 is embedded in the center of the first fiber member 43.

Any other conditions are the same as those described for the production method for the first embodiment.

Third Embodiment

Figure 8:
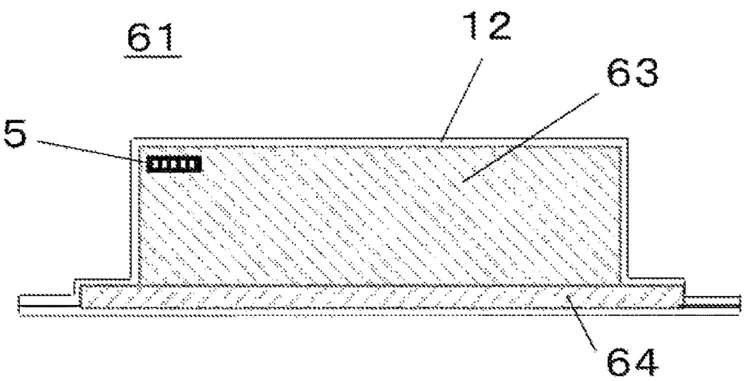
FIG. 8 is a cross-sectional view of a vacuum heat-insulation material according to a third embodiment.

FIG. 8 is a cross-sectional view of a vacuum heat-insulation material according to the third embodiment.

<Structure>

The vacuum heat-insulation material 61 according to the third embodiment differs from the vacuum heat-insulation material 11 according to the first embodiment in that the second fiber member 64 is located under the first fiber member 63 (at the bottom of the vacuum heat-insulation material 61). Matters not mentioned in this embodiment would be the same as those described for the first embodiment.

<Advantages>

The second fiber member 64 is larger than the first fiber member 63 in planer view. Accordingly, a heat-transmission path in the shell materials 12 becomes longer, and thus, it becomes possible to reduce the heat bridge in the shell materials 12. Furthermore, the vacuum heat-insulation material 61 has a structure in which the second fiber member 64 is located under the first fiber member 63 (at the bottom of the vacuum heat-insulation material 61), the vacuum heat-insulation material 61 is easy to produce.

<Production Method>

A method for producing the vacuum heat-insulation material 61 will be described below.

Figure 9:
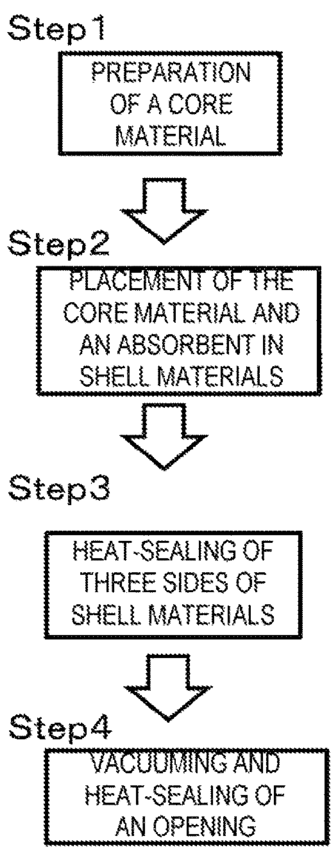
FIG. 9 is a diagram that shows a flowchart of production of the vacuum heat-insulation material according to the third embodiment.
Figure 10:
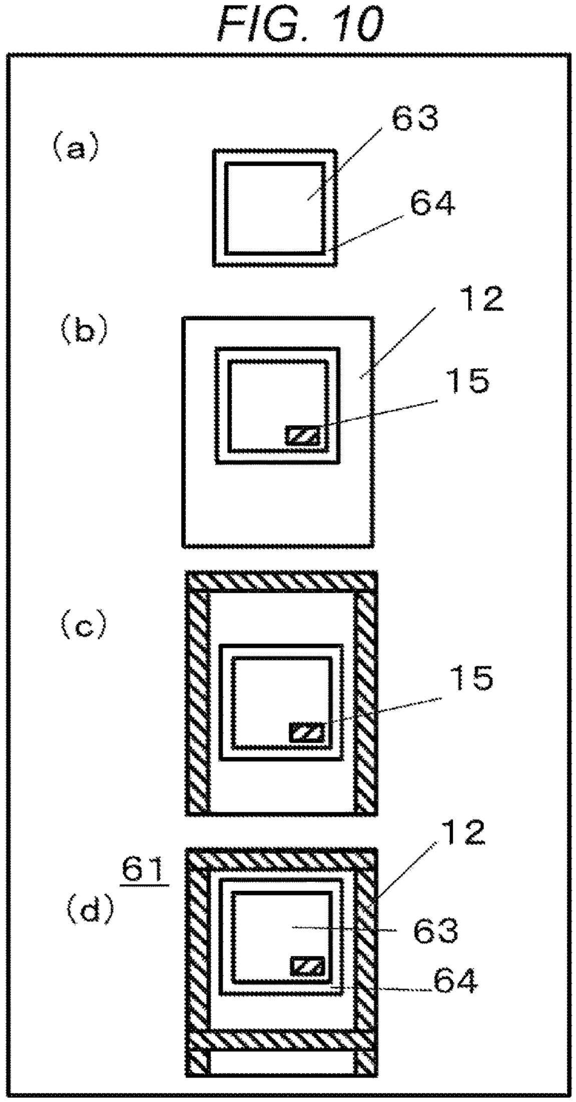
FIG. 10 shows diagrams that illustrate steps for production of the vacuum heat-insulation material according to the third embodiment.

The production flowchart is shown in FIG. 9, and the corresponding production steps are shown in FIG. 10. An order of the steps described in the production flowchart for the third embodiment is different from the order of the steps in the production flowchart for the first embodiment. Matters not mentioned in the third embodiment are the same as those described for the production method for the first embodiment.

In Step (i) and (a) of FIG. 10, the first fiber member 63 and the second fiber member 64 are prepared. Glass fiber sheets are formed by a heat-compression process, and then, the produced sheets are cut into pieces with sizes for actual use, thereby obtaining two pieces of materials for the first fiber members 63, and a material for the second fiber member 64.

In Step (ii) and (b) of FIG. 10, the materials for the first fiber members 63 and the material for the second fiber member 64 are placed between two pieces of the shell materials 12, together with an absorbent 15.

In Step (iii) and (c) of FIG. 10, three pairs of facing sides of the shell materials 12 are heat-sealed.

In Step (iv) and (d) of FIG. 10, vacuuming and sealing of the opening are carried out. The vacuum heat-insulation material having an unsealed opening is placed inside a chamber, and then, the pressure inside the chamber is reduced to 10 Pa or less. Then, the opening is heat-sealed to produce the vacuum heat-insulation material 61.

Fourth Embodiment

Figure 11:
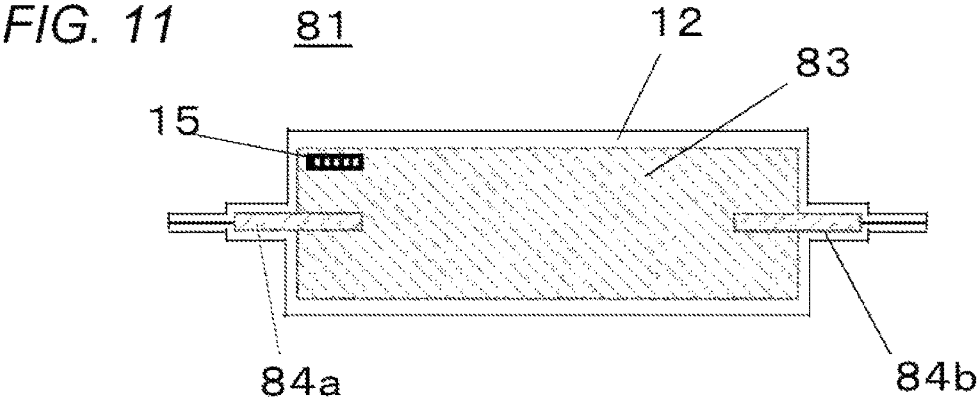
FIG. 11 is a cross-sectional view of a vacuum heat-insulation material according to a fourth embodiment.

FIG. 11 is a view of one example of a cross-sect ion of a vacuum heat-insulation material according to a fourth embodiment.

<Structure>

The vacuum heat-insulation material 81 according to the fourth embodiment differs from the vacuum heat-insulation material 11 according to the first embodiment in that a configuration of a second fiber member 84*a*, 84*b* in the fourth embodiment is different from the configuration of the second fiber member 14.

The second fiber member 84*a*, 84*b* is formed in a strip shape, or a plate shape. The second fiber member 84*a*, 84*b* is inserted into or embedded in at least one of four lateral surfaces of the first fiber member 83. FIG. 11 is a view of a cross-section of a vacuum heat-insulation material 81 in which two second fiber members 84*a* and 84*b* are inserted or embedded in respective two opposing surfaces of the first fiber member 83. One edge of each of the second fiber members 84*a* and 84*b* is located inside the first fiber member 83, and the other edge of each of them is located outside the first fiber member 83. Matters not mentioned herein would be the same as those described for the first embodiment.

The second fiber member(s) 84*a*, 84*b* may be present in not only two surfaces but also one surface, three surfaces, or four surfaces, of the first fiber member 83. Furthermore, not only one second fiber member 84*a*, 84*b* but also multiple second fiber members 84*a*, 84*b* may be present in one side of the first fiber member 83.

Not only the second fiber member 84*a*, 84*b* is present in a center of a surface of the first fiber member 83, but also it may be present in an upper or lower part of a surface of the first fiber member 83.

<Advantages>

In this structure, because of the presence of the second fiber members 84*a*, 34*b*, projecting parts are formed on the lateral surfaces of the vacuum heat-insulation material 81. According to the presence of such projecting parts, a longer heat-transmission path is provided in the shell materials 12, and thus, it becomes possible to reduce the neat bridge in the shell materials 12.

<Production Method>

A method for producing the vacuum heat-insulation material 81 will be described with reference to FIGS. 12-13.

Figure 12:
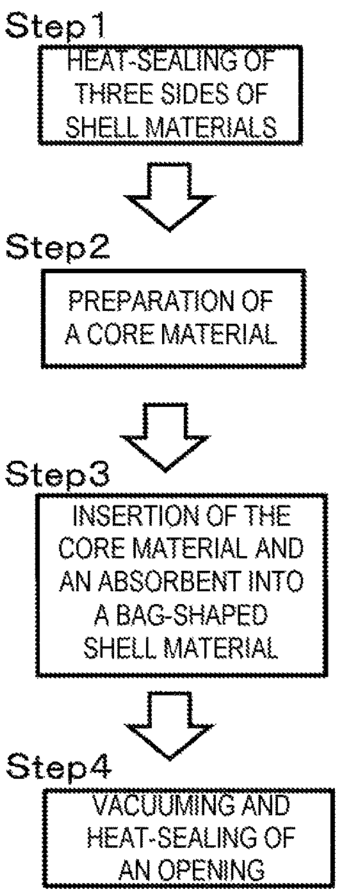
FIG. 12 is a diagram that shows a flowchart of production of the vacuum heat-insulation material according to the fourth embodiment.
Figure 13:
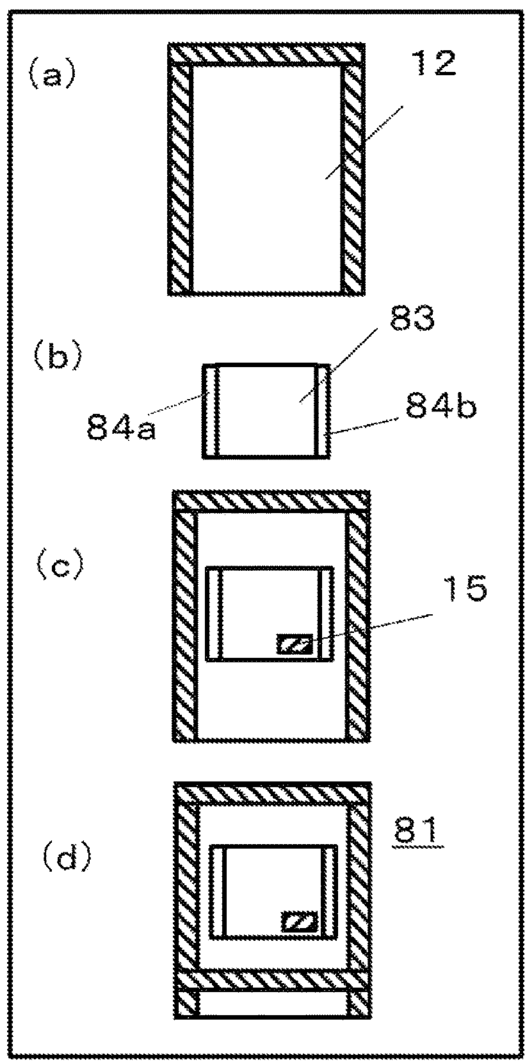
FIG. 13 shows diagrams that illustrate steps for production of the vacuum heat-insulation material according to the fourth embodiment.

The production flowchart is shown in FIG. 12. The corresponding production steps are shown in FIG. 13. The production flowchart and the production steps for the fourth embodiment are the same as those described for the first embodiment. Only a difference between the fourth and first embodiments will be mentioned. That is, in preparation of a core material in Step (ii) ((b) of FIG. 12), the second fiber member 84*a*, 84*b* is inserted into at least one of the four sides of the first fiber member 8.

There may be two methods for inserting the second fiber members 84*a*, 84*b* thereinto. With regards to the first method, a recessed part is formed on the first fiber member 83, and then, the second fiber member 84*a*, 84*b* is inserted into the recessed part. With regards to the second method, the center of a thickness-direction surface of the first fiber member 83 are cut, and the second fiber member 84*a*, 84*b* is inserted into the cut part. In this case, the part of the vacuum heat-insulation material 81 that the second fiber member 84*a*, 84*b* is inserted into will be thicker, and thus, high heat-insulation performance will be realized. Therefore, the second method is preferable.

Fifth Embodiment

Figure 14:
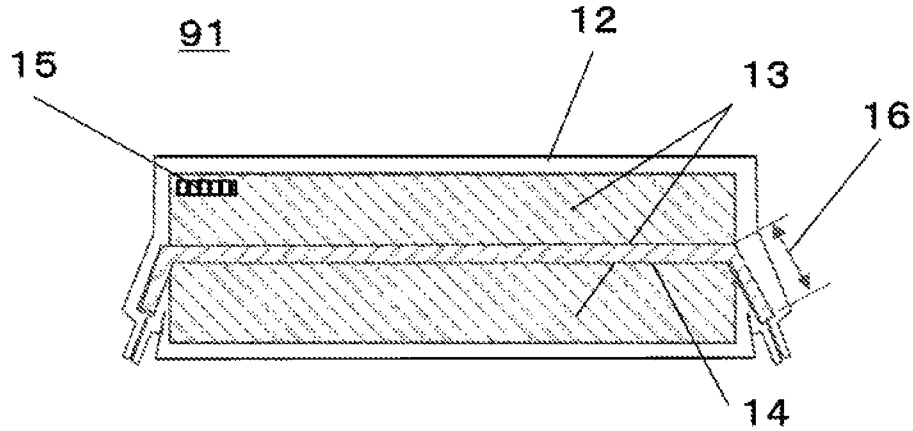
FIG. 14 is a cross-sectional view of a vacuum heat-insulation material according to a fifth embodiment.

FIG. 14 is a view of one example of a cross-section of a vacuum heat-insulation material 91 according to the fifth embodiment. A difference between the fifth embodiment and the first embodiment is that, in the fifth embodiment, a part referred to by the size 16 is folded.

The size 16 refers to the part of the second fiber member 14 that is located in an area around the first fiber members 13. The part of the second fiber member 14 corresponds to a part protruding from the vacuum heat-insulation material 91, and may be an obstruction when the vacuum heat-insulation material 91 is placed in various apparatuses. In cases where the part referred to by the size 16 is folded toward either of the sides of the first fiber members 13, the vacuum heat-insulation material 91 would be formed into a rectangular shape, and therefore, the vacuum heat-insulation material 91 can easily be placed in apparatuses or the like.

In addition, for the vacuum heat-insulation materials according to the second to fourth embodiments, the parts referred to by the size 16 can be folded in the same manner.

(On the Whole)

The embodiments can be combined. In addition, the disclosure can also be applied to heat-insulation materials other than vacuum heat-insulation materials.

Vacuum heat-insulation materials according to the disclosure can be applied to not only heat-retention/cold-storage apparatuses that require sufficient energy-saving properties, but also to devices or tools for the purpose of cold storage (e.g., container boxes and cold boxes). Furthermore, even in cases where the vacuum heat-insulation materials are configured in a small and thin shape, they will maintain excellent heat-insulation performance. Therefore, the vacuum heat-insulation materials according to the disclosure can foe applied not only to office apparatuses but also to electronic devices, and even devices or tools for the purpose of moisture retention (e.g., protections against cold, and bedclothes).

What is claimed is:

1. A vacuum heat-insulation material, comprising:

at least one first fiber member having a rectangular parallelepiped shape;

at least one second fiber member having a rectangular parallelepiped shape that is disposed directly on one surface of the at least one first fiber member and that is thinner than the at least one first fiber member, the one surface of the at least one first fiber member extending in a longitudinal direction of the at least one first fiber member; and at least one shell material that surrounds the at least one first fiber member and the at least one second fiber member, wherein the at least one second fiber member is larger in a surface direction than the at least one first fiber member such that a portion of the at least one second fiber member extends beyond the at least one first fiber member in the surface direction, the shell material is disposed on an upper surface and a lower surface of the portion of the at least one second fiber member extending beyond the at least one first fiber member in the surface direction, and the at least one first fiber member includes at least two first fiber members, and the at least one second fiber member is placed between said at least two first fiber members.

2. The vacuum heat-insulation material according to claim 1, wherein the at least one second fiber member is a member that is formed separately from the at least one first fiber member.

3. The vacuum heat-insulation material according to claim 1, wherein the at least one first fiber member and the at least one second fiber member are formed into a single body.

4. The vacuum heat-insulation material according to claim 1, wherein one edge of the at least one second fiber member is embedded in one surface of the at least one first fiber member, and the other edge of the at least one second fiber member is located outside the at least one first fiber member.

5. The vacuum heat-insulation material according to claim 4, wherein the at least one first fiber member includes only one first fiber member, and the at least one second member includes multiple second fiber members.

6. The vacuum heat-insulation material according to claim 5, wherein the multiple second fiber members are provided at opposing surfaces of the first fiber member.

7. The vacuum heat-insulation material according to claim 1, wherein the at least one first fiber member and the at least one second fiber member are formed of inorganic fiber materials.

8. The vacuum heat-insulation material according to claim 1, wherein the at least one second fiber member is formed of an inorganic fiber material, a ceramic, or a resin.

9. The vacuum heat-insulation material according to claim 1, further comprising an absorbent, wherein the absorbent, the at least one first fiber member, and the at least one second fiber member are enclosed by the at least one shell material.

10. The vacuum heat-insulation material according to claim 1, wherein the at least one shell material includes two shell materials, the two shell materials cover the vacuum heat-insulation material at upper and lower sides of the vacuum heat-insulation material, and the two shell materials are overlapped and joined in an outer peripheral area of the vacuum heat-insulation material.

11. The vacuum heat-insulation material according to claim 1, wherein the at least one second fiber member is folded around an outer peripheral part of the at least one first fiber member.

12. The vacuum heat-insulation material according to claim 1, wherein the shell material is disposed directly on the upper surface and the lower surface of the portion of the at least one second fiber member extending beyond the at least one first fiber member in the surface direction.

* * * * *